(12) United States Patent
Guen

(10) Patent No.: US 8,728,644 B2
(45) Date of Patent: May 20, 2014

(54) RECHARGEABLE BATTERY

(75) Inventor: Minhyung Guen, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 172 days.

(21) Appl. No.: 13/067,768

(22) Filed: Jun. 24, 2011

(65) Prior Publication Data

US 2012/0189884 A1  Jul. 26, 2012

(30) Foreign Application Priority Data

Jan. 25, 2011 (KR) .................. 10-2011-0007282

(51) Int. Cl.
*H01M 2/12* (2006.01)
(52) U.S. Cl.
USPC ............................................. 429/82
(58) Field of Classification Search
None
See application file for complete search history.

(56) References Cited

U.S. PATENT DOCUMENTS

| 2008/0318123 | A1* | 12/2008 | Jiang et al. ............ 429/164 |
| 2009/0029193 | A1* | 1/2009 | Onnerud et al. ............ 429/7 |
| 2009/0311611 | A1* | 12/2009 | Wu et al. ............ 429/338 |
| 2010/0266879 | A1 | 10/2010 | Byun et al. |
| 2010/0279156 | A1* | 11/2010 | Kim et al. ............ 429/56 |
| 2010/0323234 | A1 | 12/2010 | Kim et al. |
| 2011/0135976 | A1* | 6/2011 | Byun ............ 429/56 |
| 2011/0177387 | A1* | 7/2011 | Byun et al. ............ 429/178 |
| 2011/0183193 | A1* | 7/2011 | Byun et al. ............ 429/178 |
| 2011/0183197 | A1* | 7/2011 | Byun et al. ............ 429/185 |
| 2011/0244281 | A1* | 10/2011 | Byun ............ 429/62 |
| 2011/0300414 | A1* | 12/2011 | Baek ............ 429/7 |
| 2011/0300419 | A1* | 12/2011 | Byun ............ 429/61 |
| 2011/0300435 | A1* | 12/2011 | Byun ............ 429/178 |
| 2011/0305928 | A1* | 12/2011 | Kim et al. ............ 429/61 |
| 2011/0305929 | A1* | 12/2011 | Byun ............ 429/61 |
| 2012/0021277 | A1* | 1/2012 | Byun et al. ............ 429/178 |
| 2012/0141845 | A1* | 6/2012 | Byun et al. ............ 429/61 |

FOREIGN PATENT DOCUMENTS

| JP | 2004-111300 | 4/2004 |
| KR | 10-2010-0116028 A | 10/2010 |
| KR | 10-2010-0137904 A | 12/2010 |
| KR | 10-2011-0005197 A | 1/2011 |

* cited by examiner

*Primary Examiner* — Patrick Ryan
*Assistant Examiner* — Wyatt McConnell
(74) *Attorney, Agent, or Firm* — Lee & Morse, P.C.

(57) ABSTRACT

A rechargeable battery includes an electrode assembly having a first electrode plate, a separator and a second electrode plate, a first collector plate electrically connected to the first electrode plate, a second collector plate electrically connected to the second electrode plate, a case accommodating the electrode assembly, the first collector plate and the second collector plate, a first electrode terminal electrically connected to the first collector plate, a second electrode terminal electrically connected to the second collector plate, a first plate connected to the first collector plate and the first electrode terminal and sealing the case, a second plate connected to the second collector plate and the second electrode terminal and including a short-circuit plate, and an insulation plate interposed between the first plate and the second plate.

18 Claims, 6 Drawing Sheets

RECHARGEABLE BATTERY

BACKGROUND

1. Field

Embodiments described herein relate to a rechargeable battery.

2. Description of the Related Art

Unlike a primary battery, a rechargeable battery may be recharged. Low capacity batteries are packaged in forms of pack used for various portable small electronic devices such as phones, and camcorders. A large capacity rechargeable battery composed of a plurality of cells connected in a form of a pack is widely used as the power source for driving motors, such as those for electric scooters, hybrid electric vehicles (HEV), or the like.

Such a rechargeable battery is manufactured in various forms. The representative form of a rechargeable battery is a cylindrical form or a prismatic form.

A rechargeable battery typically includes an electrode assembly having a positive electrode and a negative electrode with a separator interposed therebetween, the electrode assembly is housed in a case with an electrolyte, and a cap plate is installed in the case. A positive electrode terminal and a negative electrode terminal are connected to the electrode assembly and are exposed and protruded to the outside through the cap plate.

SUMMARY

According to an embodiment, a rechargeable battery includes an electrode assembly having a first electrode plate, a separator and a second electrode plate, a first collector plate electrically connected to the first electrode plate, a second collector plate electrically connected to the second electrode plate, a case accommodating the electrode assembly, the first collector plate and the second collector plate, a first electrode terminal electrically connected to the first collector plate, a second electrode terminal electrically connected to the second collector plate, a first plate connected to the first collector plate and the first electrode terminal and sealing the case, a second plate connected to the second collector plate and the second electrode terminal and including a short-circuit plate, and an insulation plate interposed between the first plate and the second plate.

The short-circuit plate may include a round part that bends convexly away from the second plate and edge parts at sides of the round part, the edge parts being coupled to the second plate.

The first plate may include a protruding part at a location corresponding to the short-circuit plate.

The protruding part may protrude toward the short-circuit plate.

The protruding part may have a diameter smaller than that of the round part of the short-circuit plate.

The short-circuit plate may be made of copper or a copper alloy.

The first electrode terminal may be welded to one end portion of the first plate, and a first hole may be formed at another end portion of the first plate.

The second electrode terminal may be welded to one end portion of the second plate and a second hole may be formed at another end portion of the second plate.

The rechargeable battery may include a safety vent between the first electrode terminal and the first hole of the first plate, a second plate safety vent hole between the second electrode terminal and the second hole of the second plate, and an insulation plate safety vent hole formed between an insulation plate first hole and an insulation plate second hole of the insulation plate. The safety vent, the second plate safety vent hole and the insulation plate safety vent hole may be located and sized to correspond to one another.

The second electrode terminal may insertably penetrate the insulation plate first hole and the first collector plate may insertably penetrate the insulation plate second hole.

The short-circuit plate may be formed between the second electrode terminal and the safety vent hole of the second plate.

The insulation plate may include a short-circuiting hole formed between the insulation plate first hole and the insulation plate safety vent hole.

The round part of the short-circuit plate may be located and sized to correspond to the short-circuiting hole.

The insulation plate may be made of at least one of polyphenylene sulfide, polyethylene, polypropylene, and polyamide.

The first plate may be made of aluminum or an aluminum alloy.

The second plate may be made of copper or a copper alloy.

The first collector plate and the first plate may be welded to each other.

The second collector plate and the second plate may be welded to each other.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
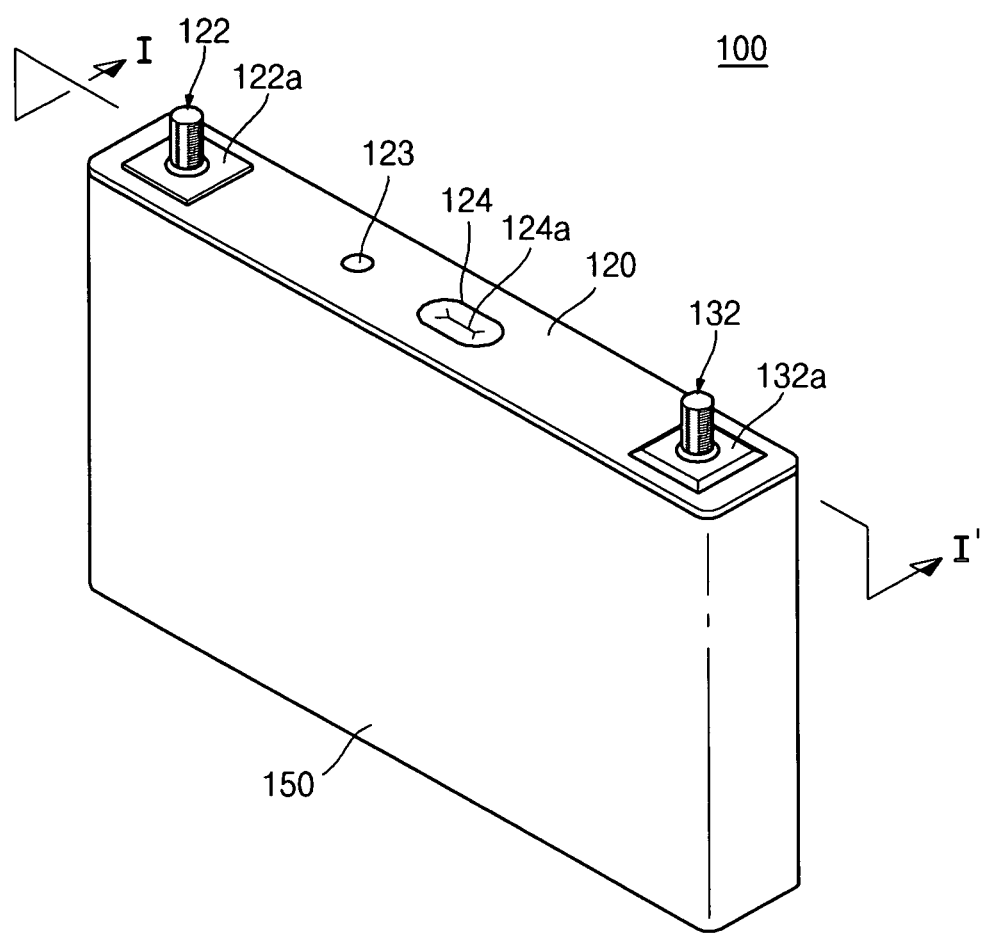
FIG. 1 illustrates a perspective view of a rechargeable battery according to an embodiment.

Korean Patent Application No. 10-2011-0007282, filed on Jan. 25, 2011, in the Korean Intellectual Property Office, and entitled: "Rechargeable Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

Figure 2A:
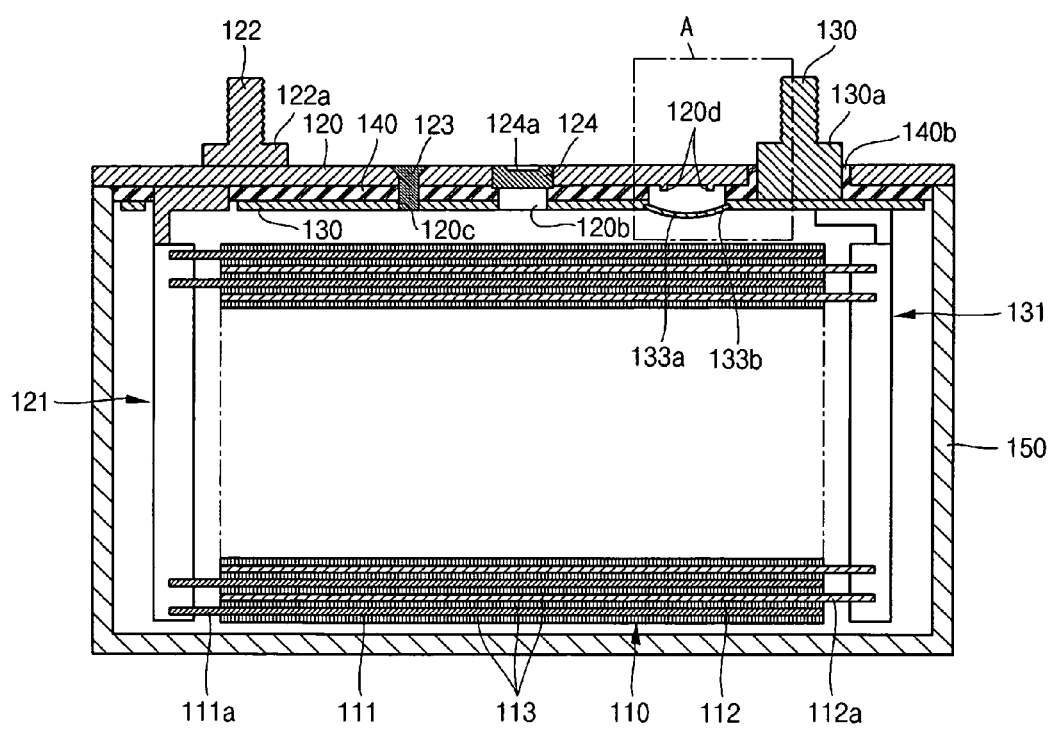
FIG. 2A illustrates a cross-sectional view of the rechargeable battery taken along the line 1-1' of FIG. 1.

FIG. 1 is a perspective view of a rechargeable battery according to an embodiment, and FIG. 2A is a cross-sectional view of the rechargeable battery taken along the line 1-1' of FIG. 1.

As shown in FIG. 1, the illustrated rechargeable battery 100 includes an electrode assembly 110, a first plate 120, a second plate 130, an insulation plate 140, and a case 150.

The electrode assembly 110 may be formed by winding a stack of a first electrode plate 111, a separator 113 and a second electrode plate 112 or stacking the stack together. The first electrode plate 111 may operate as a negative electrode and the second electrode plate 112 may operate as a positive electrode, or vice versa.

The first electrode plate 111 may be formed by coating a first electrode active material such as graphite or carbon on a first electrode collector formed of a metal foil made of copper or nickel. The first electrode plate 111 may include a first electrode uncoated region 111a, which is a region not coated with a first electrode active material. The first electrode uncoated region 111a becomes a path of the flow of current between the first electrode plate 111 and the outside thereof. However, the material of the first electrode plate 111 is not limited thereto.

The second electrode plate 112 may be formed by coating a second electrode active material such as a transition metal oxide on a second electrode collector formed of a metal foil made of aluminum. The second electrode plate 112 may include a second electrode uncoated region 112a, which is a region not coated with a second electrode active material. The second electrode uncoated region 112a becomes a path of the flow of current between the second electrode plate 112 and the outside thereof. However, the material of the second electrode plate 112 is not limited thereto.

The first electrode plate 111 and the second electrode plate 112 may have different polarities.

The separator 113 may be interposed between the first electrode plate 111 and the second electrode plate 112 for preventing a short-circuit therebetween and for allowing the movement of lithium ions. The separator 113 may be formed of polyethylene (PE), polypropylene (PP), or a composite film of PE and PP. However, the material of the separator 113 is not limited thereto.

A first plate 120 and a second plate 130 are electrically connected to the first electrode plate 111 and the second electrode plate 112 at opposing ends of the electrode assembly 110, respectively.

The electrode assembly 110 is accommodated in the case 150 with an electrolyte. The electrolyte may include an organic solvent such as ethylene carbonate (EC), propylene carbonate (PC), diethyl carbonate (DEC), ethyl methyl carbonate (EMC) or dimethyl carbonate (DMC), and a lithium salt such as $LiPF_6$ or $LiBF_4$. The electrolyte may be a liquid, solid, and/or gel electrolyte.

Figure 2B:
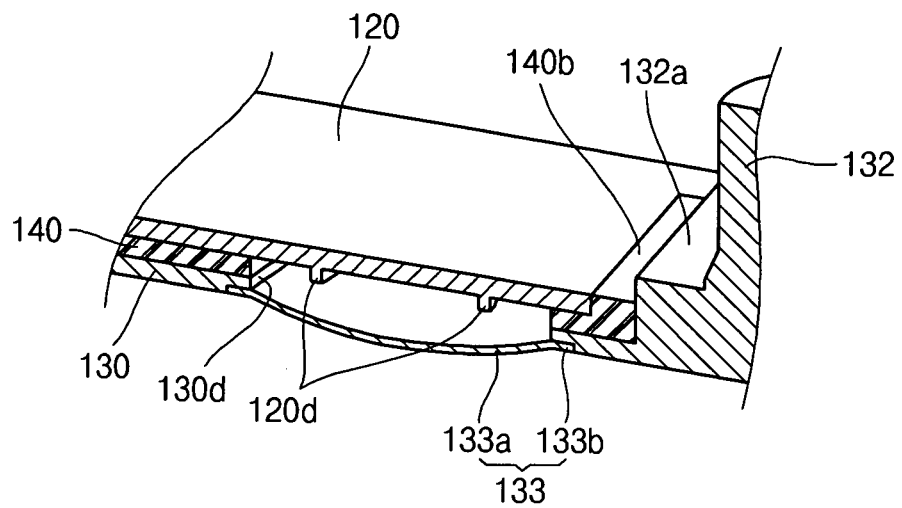
FIGS. 2B and 2C illustrate enlarged perspective views of a portion 'A' shown in FIG. 2A.
Figure 2C:
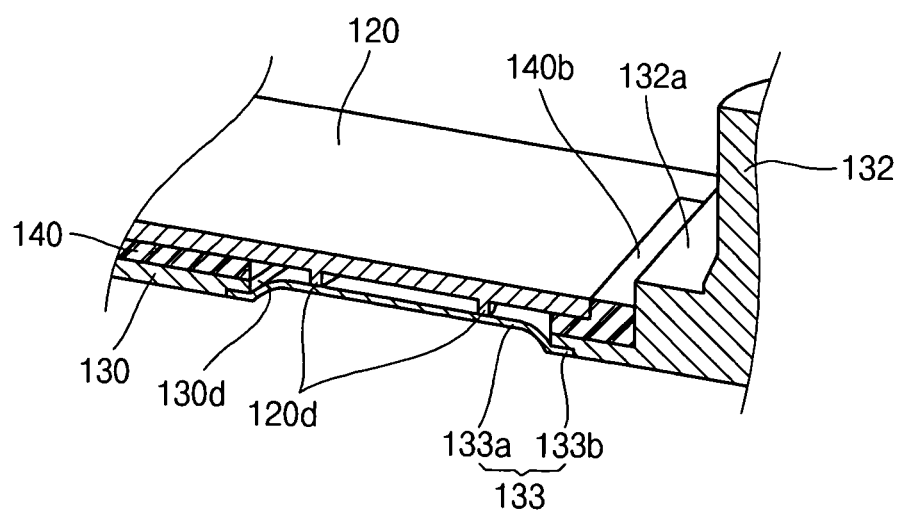
Figure 3:
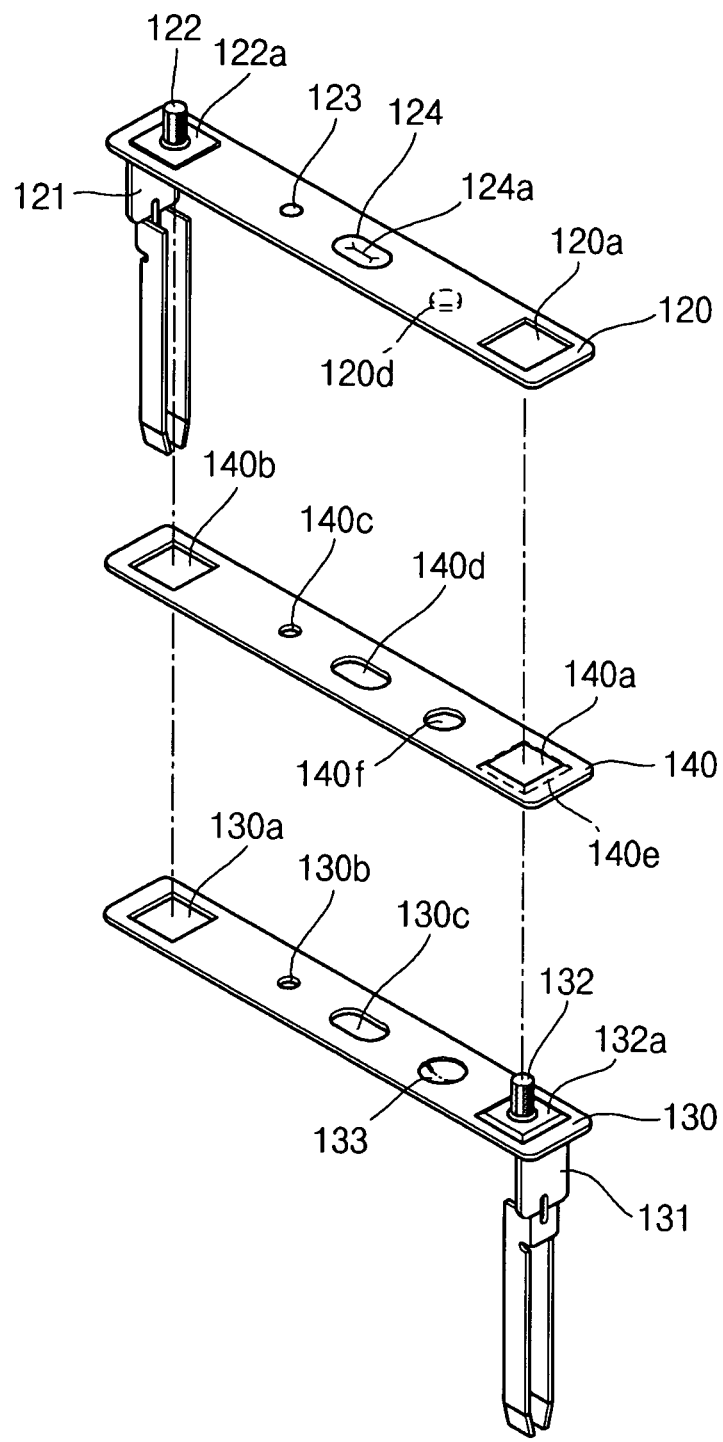
FIG. 3 illustrates an exploded perspective view of a first plate, a second plate and an insulation plate shown in FIG. 1.
Figure 4A:
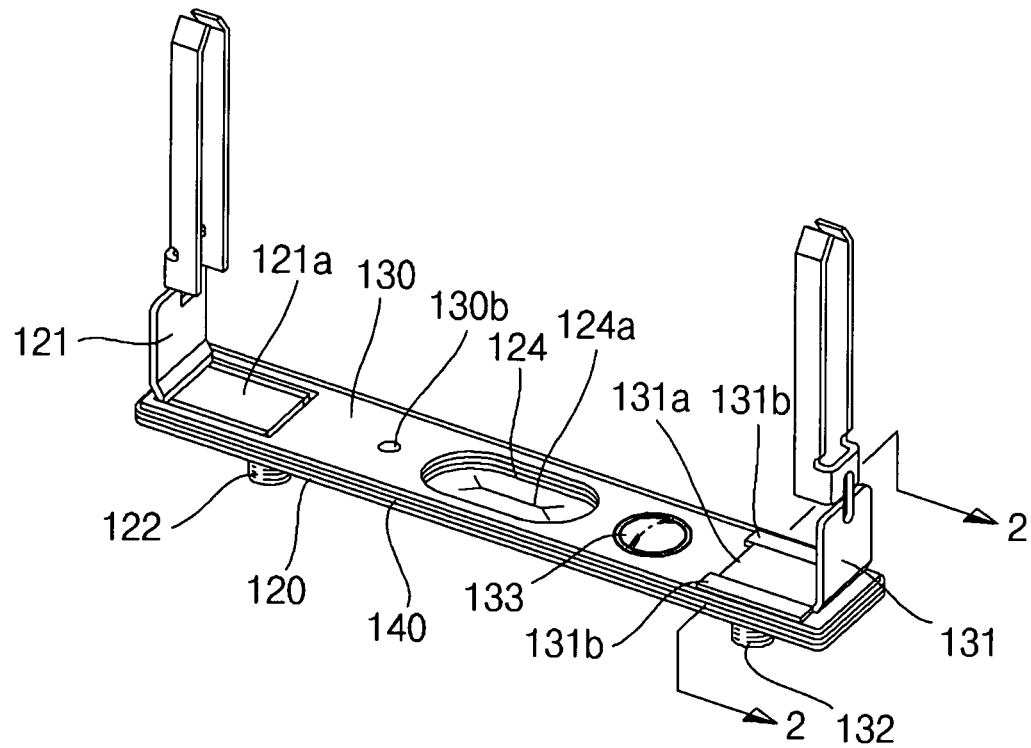
FIG. 4A illustrates a perspective view illustrating a state in which the first plate, the second plate and the insulation plate shown in FIG. 3 are assembled.
Figure 4B:
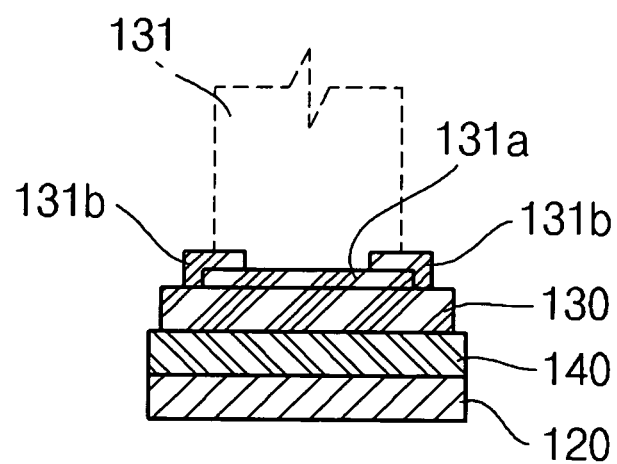
FIG. 4B illustrates a cross-sectional view illustrating a state in which the second plate and the second collector plate taken along the line 2-2 of FIG. 4A are assembled.
Figure 5:
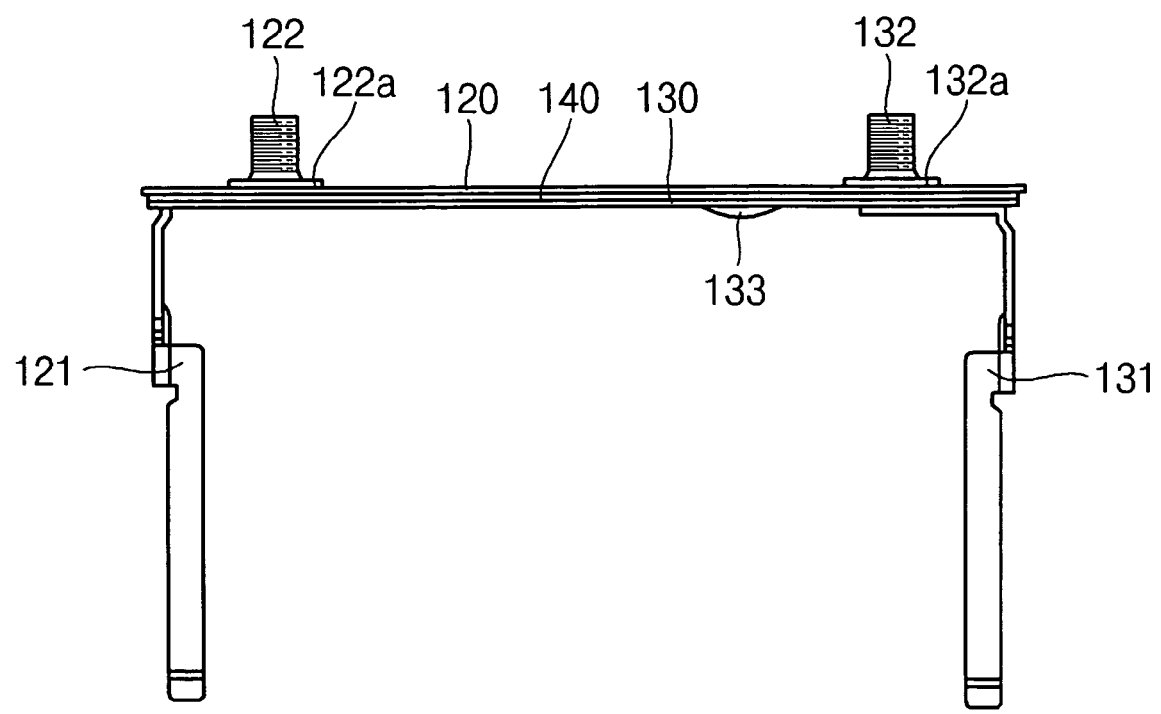
FIG. 5 illustrates a front view illustrating a state in which the first plate, the second plate and the insulation plate shown in FIG. 3 are assembled.

FIGS. 2B and 2C are enlarged perspective views of a portion 'A' shown in FIG. 2A, FIG. 3 is an exploded perspective view of a first plate, a second plate and an insulation plate shown in FIG. 1, FIG. 4A is a perspective view illustrating a state in which the first plate, the second plate and the insulation plate shown in FIG. 3 are assembled, FIG. 4B is a cross-sectional view, taken along the line 2-2 of FIG. 4A, illustrating a state in which the second plate and the second collector plate are assembled, and FIG. 5 is a front view illustrating a state in which the first plate, the second plate and the insulation plate shown in FIG. 3 are assembled.

The first plate 120 may include a first collector plate 121, a first electrode terminal 122, a plug 123, and a safety vent 124.

The first plate 120 seals the case 150 to be described below. The first plate 120 may be made of aluminum or an aluminum alloy. The first electrode terminal 122 may be welded to one end portion of the first plate 120, and a first hole 120a may be formed at another end portion of the first plate 120. A second electrode terminal 132 is inserted into the first hole 120a, which is sized to allow the second electrode terminal 132 to be inserted thereinto.

The first plate 120 may include a first hole 120a, a safety vent 124 formed at the center of the first plate, and an electrolyte injection hole 120c formed between the first electrode terminal 122 and the safety vent 124 of the first plate 120. The first plate 120 has a protruding part 120d between the safety vent 124 and the first hole 120a. The protruding part 120d protrudes toward a short-circuit plate 133 to be described below. The protruding part 120d may have a diameter smaller than that of a round part 133a of the short-circuit plate 133, described below.

The first collector plate 121 contacts the first electrode uncoated region 111a protruding toward one end of the electrode assembly 110. The first collector plate 121 may be welded to the first electrode uncoated region 111a. The first collector plate 121 may be substantially formed in a '[' shape, such as a shape that is bent at a right angle. The first collector plate 121 may be made of aluminum or an aluminum alloy, like the first electrode terminal 122. The first collector plate 121 may be welded to the first plate 120.

The first collector plate 121 may penetrate a second hole 140b formed in the insulation plate 140 and a second hole 130a formed in the second plate 130, as described below.

The first collector plate 121 may include a first bent part 121a. The first bent part 121a may be bent at a substantially right angle and may extend from the first collector plate 121 to then be integrally welded to a lower portion of the first plate 120.

The first electrode terminal 122 is electrically connected to the first electrode plate 111. The first electrode terminal 122 may be made of the same material as the first plate 120, such as, for example, aluminum. The first electrode terminal 122 may include a first connection part 122a having width that is larger than a width of a remaining portion of the first electrode terminal 122. The first connection part 122a may have a substantially rectangular parallelepiped shape. The first connection part 122a may be welded to the first plate 120 to be integrally formed therewith.

The plug 123 may seal the electrolyte injection hole 120c of the first plate 120.

The safety vent 124 may be installed in a vent hole 120b of the first plate 120 and may include a notch 124a that is configured to open at a predetermined pressure.

The second plate 130 includes a second collector plate 131, a second electrode terminal 132, and a short-circuit plate 133.

The second plate 130 is formed beneath the first plate 120. The second plate 130 may be made of copper or a copper alloy. The second plate 130 may be welded to the second collector plate 131. A second electrode terminal 132 is welded to one end portion of the second plate 130, and a second hole 130a is formed at the another end portion of the second plate 130. The second hole 130a may be sized to allow the first collector plate 121 to be inserted thereinto.

A safety vent hole 130c may be formed in the center of the second plate, between the electrode terminal 132 and the second hole 130a. In the second plate 130, an electrolyte injection hole 130b may formed between the second hole 130a and the safety vent hole 130c. The electrolyte injection hole 130b of the second plate 130 is sized and located to correspond to the electrolyte injection hole 120c of the first plate 120. The safety vent hole 130c of the second plate 130 is sized and located to correspond to the safety vent 124 of the first plate 120.

The second plate 130 may have a width smaller than that of the first plate 120. The first plate 120 is welded to the case 150 to be electrically connected thereto, while the second plate 130 is not electrically connected to the case 150, thereby preventing a short-circuit.

The second collector plate 131 contacts the second electrode uncoated region 112a, which protrudes toward one end of the electrode assembly 110, for example an end of the electrode assembly 110 that is opposite to the end toward which the first electrode uncoated region 111a protrudes. The second collector plate 131 may be welded to the second electrode uncoated region 112a. The second collector plate 131 may be substantially formed in a 'ㄱ' shape, such as a shape that is bent at a right angle. The second collector plate 131 may be welded to the second plate 130.

The second collector plate 131 may include a second bent part 131a and a second side part 131b.

The second bent part 131a may be bent at a substantially right angle and may extend from the second collector plate 131 to then be integrally welded to a lower portion of the second plate 130. The second side part 131b may include portions that are spaced apart from each other by a width of the second bent part 131 and that extend along a length of the second bent part 131a apart from a lateral surface of the second bent part 131a. The second bent part 131a may be slidably coupled to the second side part 131b to then be welded thereto, thereby fixing the second collector plate 131. The first collector plate 121 may be coupled to the first plate 120 in the same manner.

The second electrode terminal 132 is electrically connected to the second electrode plate 112. The second electrode terminal 132 may be made of the same material as the second plate 130, such as for example, copper or a copper alloy. The second electrode terminal 132 may have the same shape as the first electrode terminal 122. Thus, a description of the shape of the second electrode terminal 132 will not be repeated.

The second electrode terminal 132 may penetrate the first hole 120a formed at one end portion of the first plate 120 and the first hole 140a formed at one end portion of the insulation plate 140.

A second connection part 132a is formed between the second electrode terminal 132 and the second plate 130. The second connection part 132a may be formed to a height and may be sized to correspond to thicknesses of the first plate 120 and the insulation plate 140.

The short-circuit plate 133 may be located between the second electrode terminal 132 and the safety vent hole 130c of the second plate 130. The short-circuit plate 133 may include a round part 133a convexly bent away from the second plate 130 and edge parts 133b coupled to the second plate 130.

When overcharge occurs to the rechargeable battery 100, the round part 133a of the short-circuit plate 133 may be inverted because the internal pressure of the rechargeable battery 100 exceeds a predetermined pressure level due to the gas generated within the rechargeable battery 100. Thus, in such a circumstance, the round part 133a may convexly protrude toward the first plate 130. The short-circuit plate 133 may come into contact with the protruding part 120d of the first plate 120, causing a short-circuit, thereby securing stability of the rechargeable battery 100.

The short-circuit plate 133 may be made of the same-polarity material as the second plate 130, such as, for example, copper or a copper alloy.

The insulation plate 140 is formed between the first plate 120 and the second plate 130 and electrically insulates the first plate 120 from the second plate 130. The insulation plate 140 may be made of at least one material selected from polyamide, polyphenylene sulfide resin, polyethylene, and polypropylene. The insulation plate 140 may be made of a material that has heat resistance, high strength and an electrical insulating property and is not reactive with an electrolyte. The material of the insulation plate 140 is not limited to the materials listed herein.

A first hole 140a and a second hole 140b are formed at opposite end portions of the insulation plate 140. The second hole 140b of the insulation plate is sized and located to correspond to the second hole 130a of the second plate 130. The first collector plate 121 is inserted into the second hole 140b of the insulation plate 140 and the second hole 130a of the second plate 130. The first hole 140a of the insulation plate 140 is sized and located to correspond to the first hole 120a of the first plate 120. The second electrode terminal 132 is inserted into the first hole 140a of the insulation plate and the first hole 120a of the first plate 120. In addition, insulation plate 140a surrounding the first hole 140a may have a protrusion 140e having a thickness corresponding to a thickness of the first plate 120. The protrusion 140e in the insulation plate 140 may penetrate the first hole 120a of the first plate 120. Thus, the protrusion 140e may insulate the first plate 120 from the second electrode terminal 132.

A safety vent hole 140d may be formed in the center of the insulation plate between the first hole 140a and the second hole 140b. An electrolyte injection hole 140c may be formed between the second hole 140b and the safety vent hole 140d of the insulation plate 140. The electrolyte injection hole 140c may be sized and located to correspond to the electrolyte injection hole 120c of the first plate 120. The safety vent hole 140d may be sized and located to correspond to the safety vent 124 of the first plate 120.

A short-circuit hole 140f is formed between the first hole 140a and the safety vent hole 140d of the insulation plate 140. The short circuit hole 140f may be sized and located to correspond to the short-circuit plate 133 of the second plate 130.

When the first plate 120, the second plate 130 and the insulation plate 140 are assembled, the safety vent 124 of the first plate 120, the safety vent hole 130c of the second plate 130, and the safety vent hole 140d of the insulation plate 140 may correspond to one another in the same size at the same location. In addition, the electrolyte injection hole 120c of the first plate 120, the electrolyte injection hole 130b of the second plate 130, and the electrolyte injection hole 140c of the insulation plate 140 may correspond to one another in the same size at the same location.

The case 150 may be formed of a conductive metal such as aluminum, an aluminum alloy or nickel plated steel, and may have a substantially rectangular parallelepiped shape having an opening in which the electrode assembly 110, the first collector plate 121 and the second collector plate 131 can be inserted and mounted. The inner surface of the case 150 may be processed with an insulation treatment, thereby being insulated from the electrode assembly 110, the first collector plate 121 and the second collector plate 131.

By way of summation and review, embodiments described herein provide a rechargeable battery, in which a manufacturing process can be simplified and manufacturing costs can be saved by incorporating an electrode terminal and a plate. Moreover, the rechargeable battery according to embodiments described herein can secure safety during overcharge.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope thereof as set forth in the following claims.

What is claimed is:

1. A rechargeable battery, comprising:
   an electrode assembly having a first electrode plate, a separator and a second electrode plate;
   a first collector plate electrically connected to the first electrode plate;
   a second collector plate electrically connected to the second electrode plate;
   a case accommodating the electrode assembly, the first collector plate and the second collector plate;
   a first electrode terminal electrically connected to the first collector plate;
   a second electrode terminal electrically connected to the second collector plate;
   a first plate connected to the first collector plate and the first electrode terminal and sealing an opening in the case through which the electrode assembly, the first electrode plate, and the second electrode plate are inserted, the first plate contacting the case at a perimeter of the opening;
   a second plate connected to the second collector plate and the second electrode terminal and including a short-circuit plate; and
   an insulation plate interposed between the first plate and the second plate.

2. The rechargeable battery as claimed in claim 1, wherein the short-circuit plate includes a round part that bends convexly away from the second plate and edge parts at sides of the round part, the edge parts being coupled to the second plate.

3. The rechargeable battery as claimed in claim 2, wherein the first plate includes a protruding part at a location corresponding to the short-circuit plate.

4. The rechargeable battery as claimed in claim 3, wherein the protruding part protrudes toward the short-circuit plate.

5. The rechargeable battery as claimed in claim 3, wherein the protruding part has a diameter smaller than that of the round part of the short-circuit plate.

6. The rechargeable battery as claimed in claim 2, wherein the short-circuit plate is made of copper or a copper alloy.

7. The rechargeable battery as claimed in claim 1, wherein:
   the first electrode terminal is welded to one end portion of the first plate, and
   a first hole is formed at another end portion of the first plate.

8. The rechargeable battery as claimed in claim 1, wherein:
   the second electrode terminal is welded to one end portion of the second plate and a second hole is formed at another end portion of the second plate.

9. The rechargeable battery as claimed in claim 1, including:
   a safety vent between the first electrode terminal and a first hole of the first plate;
   a second plate safety vent hole between the second electrode terminal and a second hole of the second plate; and
   an insulation plate safety vent hole between an insulation plate first hole and an insulation plate second hole of the insulation plate,
   wherein the safety vent, the second plate safety vent hole and the insulation plate safety vent hole are located and sized to correspond to one another.

10. The rechargeable battery as claimed in claim 9, wherein:
    the second electrode terminal insertably penetrates the insulation plate first hole, and
    the first collector plate insertably penetrates the insulation plate second hole.

11. The rechargeable battery as claimed in claim 9, wherein the short-circuit plate is formed between the second electrode terminal and the safety vent hole of the second plate.

12. The rechargeable battery as claimed in claim 9, wherein the insulation plate includes a short-circuiting hole formed between the insulation plate first hole and the insulation plate safety vent hole.

13. The rechargeable battery as claimed in claim 12, wherein a round part of the short-circuit plate is located and sized to correspond to the short-circuiting hole.

14. The rechargeable battery as claimed in claim 1, wherein the insulation plate is made of at least one of polyphenylene sulfide, polyethylene, polypropylene, and polyamide.

15. The rechargeable battery as claimed in claim 1, wherein the first plate is made of aluminum or an aluminum alloy.

16. The rechargeable battery as claimed in claim 1, wherein the second plate is made of copper or a copper alloy.

17. The rechargeable battery as claimed in claim 1, wherein the first collector plate and the first plate are welded to each other.

18. The rechargeable battery as claimed in claim 1, wherein the second collector plate and the second plate are welded to each other.

* * * * *